Dec. 8, 1970    F. HUDMAN ET AL    3,546,544
FULL WAVE RECTIFIER ASSEMBLIES
Filed Oct. 21, 1968    2 Sheets-Sheet 2

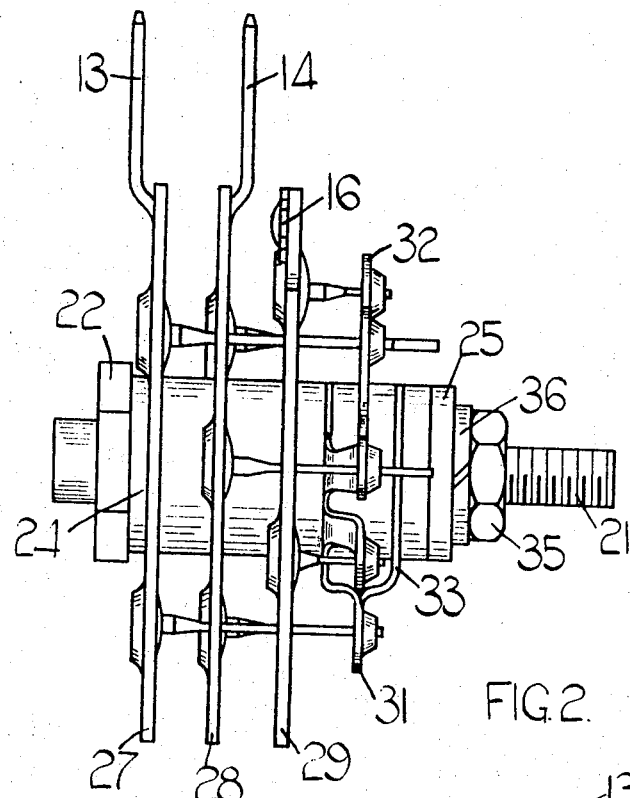
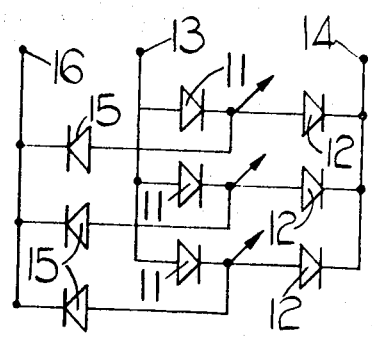
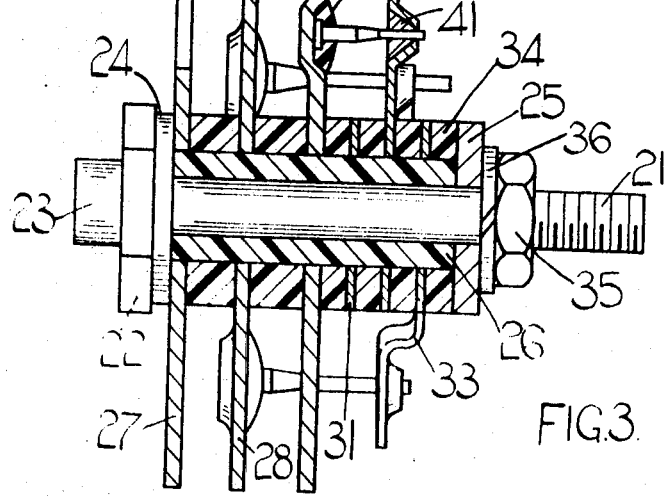

INVENTOR
Brian Bedford & Frank Hudman
BY Glascock, Downing
& Seebold
ATTORNEYS

United States Patent Office 3,546,544
Patented Dec. 8, 1970

3,546,544
FULL WAVE RECTIFIER ASSEMBLIES
Frank Hudman and Brian Bedford, Sutton Coldfield, England, assignors to Joseph Lucas (Industries) Limited, Birmingham, England, a British company
Filed Oct. 21, 1968, Ser. No. 769,186
Int. Cl. H01l 1/14
U.S. Cl. 317—234                         1 Claim

ABSTRACT OF THE DISCLOSURE

A full wave rectifier assembly includes an axially extending support member having a pair of axially spaced terminal plates mounted thereon with each plate carrying a number of diodes equal in number to the number of phases of the supply to be rectified. The diodes on one terminal plate have their cathodes electrically connected to said one terminal plate, and the diodes on the other terminal plate have their anodes electrically connected to said other terminal plate. A plurality of phase plates equal in number to the number of phases to be rectified are carried by the support member and are mounted in axially spaced relationship on one side of the pair of terminal plates. Leads extend from the diodes in a generally axial direction, and are secured to the phase plates so that upon connection of the phase plates to the phases of an A.C. source a rectified supply will be available at the terminal plates.

---

Figure 4:
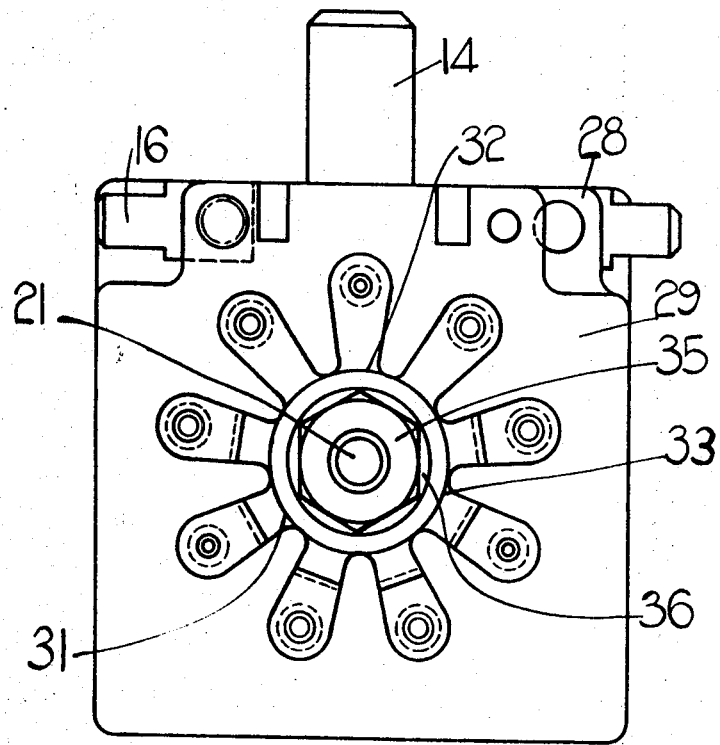

This invention relates to full wave rectifier assemblies.

An assembly according to the invention comprises in combination an axially extending support member, a pair of axially spaced terminal plates mounted on said member, each terminal plate carrying a number of diodes equal in number to the number of phases of the supply to be rectified, the diodes carried by one terminal plate having their cathodes electrically connected thereto and the diodes carried by the other terminal plate having their anodes electrically connected thereto, a plurality of phase plates equal to the number of phases to be rectified, the phase plates being mounted on the support member in axially spaced relationship on one side of the pair of terminal plates, and the leads extending from the diodes in a generally axial direction and secured to the phase plates, whereby upon connection of the phase plates to the phases of an A.C. source a rectified supply will be produced at the terminal plates, each phase plate being split into parts and said parts of each phase plate having leads secured thereto being movable relative to each other axially.

An example of the invention is illustrated in the accompanying drawings, in which, FIG. 1 is a circuit diagram,
FIG. 2 is a side view of the assembly,
FIG. 3 is a sectional side view corresponding to FIG. 2, and
FIG. 4 is an end view of FIG. 2.

The construction to be described is intended to be mounted within a three-phase alternator utilized in a road vehicle, so as to provide an output for charging the battery, and a subsidiary output for operating an indicator lamp on the road vehicle. The circuit diagram is shown in FIG. 1, from which it will be seen that the full wave rectifier consists of three pairs of diodes 11, 12 each pair being connected in series and the junctions of the three pairs being connected to the phase points of the alternator. The anodes of the diodes 11 are connected to a ground terminal 13, and the cathodes of the diodes 12 are connected to a positive supply terminal 14. The subsidiary connection is taken from the phase points to the anodes of three diodes 15, the cathodes of which are connected to a terminal 16.

The assembly includes a screw-threaded bolt 21 having a head 22 at one end from which extends a post 23, the post 23 being engaged in use with part of the alternator casing to support the assembly. Surrounding the bolt 21 in contact with the head 22 is a washer 24, and extending between the washer 24 and a further washer 25 adjacent the opposite end of the bolt 21 in an insulating sleeve 26. The sleeve 26 supports three axially spaced terminal plates 27, 28, 29, and three phase plates 31, 32, 33, the plates being supported on the sleeve 26 in the order mentioned, with the plate 27 engaging the washer 24, and the remaining plates being spaced from each other, and, in the case of the plate 33, from the washer 25 by insulating sleeves 34. The plates 27, 28, 29 are substantially square, but the plates 31, 32, 33 are arcuate, each subtending an angle of less than 120°, and moreover plates 31 and 33 are cranked so that all three terminate in the same plane. The entire assembly is held in position by a nut 35 engaging the bolt 21, a spring washer 36 being interposed between the nut 35 and the washer 25. It will be noted that each of the plates 31, 32, 33 is split to define three interconnected flexible segments, the segments being movable relative to one another axially.

The plate 27 constitutes the terminal 13, and carries the diodes 11 with the anodes of the diodes electrically connected to the plate 27. The ground connection is made by way of the washer 24, the head 22, the bolt 21 and the casing of the alternator. The plates 28 and 29 respectively, carry the diodes 12 and 15, with the cathodes of these diodes electrically connected to their respective plates. As shown in FIG. 3, the diodes are mounted within recesses formed in the plate, and are protected with silicone rubber 37, the diode connection other than that made to the plate being made to a lead extending axially from the diode.

The three diodes mounted on the plate 27 have to be connected to the plates 31, 32, 33 respectively, and they are mounted on the plate 27 at angular positions opposite the positions on the plates 31, 32, 33 where they require to be connected. Where necessary, holes are formed in the plates 28, 29 so that the leads from the diodes on the plate 27 can extend through these holes axially towards the plates 31, 32, 33, and as shown in FIG. 3, the three segments of each of the plates 31, 32, 33 are each formed, at a position where they are to accept a lead from a diode, with a plunged or punched hole 41. The three diodes connected to the plate 28 likewise require to be connected to segments of the three phase plates, and holes are provided in the plate 29 to permit the leads from the diode on the plate 28 to extend axially towards the segments of their phase plates. Finally, the three diodes on the plate 29 must be connected to segments of the three phase plates respectively, but in this case of course, no holes are required in any plates to allow the leads to extend axially.

During manufacture, the entire structure can be assembled from the right-hand end as seen in FIG. 3. The diodes are connected to the plates 27, 28, 29 initially so that the leads extend at right angles away from the plates, and after the washer 24 and sleeve 26 have been placed on the bolt 21, the plate 27 is placed in position, followed by a washer 34, the plate 28, another washer 34, the plate 29, and so forth, ending with the washer 25, the spring washer 36 and the nut 35. The phase plates are placed on the sleeve in the correct angular position by means of a jig, and as they are placed in position the leads extending from the plates 27, 28, 29 will be guided into the appropriate plunged holes 41, in the segments. A protective cover is then engaged with the bolt 21, and this cover engages the phase plates at a position radially inwards from the plunged holes. The leads are then soldered to the respective segments of the phase plates by dipping in solder, the cover preventing the solder from running into the roots of the slots between the segments of the phase plates so that the slots do not become filled with solder, and also protecting the thread of the bolt 21.

The arrangement described in which the assembly can be carried out entirely from one end is particularly convenient in manufacture, and considerably reduces the overall cost of the rectifier. It will be appreciated that since the phase plates are arcuate, and do not overlap one another, there is no possibility of a lead being connected to the wrong phase plate. However, although it is preferred for the phase plates to be cranked so that the connections are all made in one plane, it is not essential, because quite clearly the connections could be made in three adjacent planes. If the phase plates are not to be cranked, then it is not vital that they are arcuate and do not overlap, although as explained above this feature is preferred. Where the phase plates are not cranked and arcuate, then holes must be provided in them so that leads extending axially from the plates 27, 28, 29 can pass through a phase plate if they are not to be connected to that phase plate. By virtue of the slots in the phase plates, each lead is connected to an individual segment of a phase plate, and the segment can move axially with respect to the other segments. In this way, the possibility of a lead snapping due to vibration in use is considerably reduced.

Having thus described our invention what we claim as new and desire to secure by Letters Patent is:

1. A full wave rectifier assembly comprising in combination an axially extending support member, a pair of axially spaced terminal plates mounted on said member, each terminal plate carrying a number of diodes equal in number to the number of phases of the supply to be rectified, the diodes carried by one terminal plate having their cathodes electrically connected thereto and the diodes carried by the other terminal plate having their anodes electrically connected thereto, a plurality of phase plates equal to the number of phases to be rectified, the phase plates being mounted on the support member in axially spaced relationship on one side of the pair of terminal plates, and leads extending from the diodes in a generally axial direction and secured to the phase plates whereby upon connection of the phase plates to the phases of an A.C. source a rectified supply will be produced at the terminal plates, each phase plate being split into parts and said parts of each phase plate having leads secured thereto being movable relative to each other axially.

References Cited

UNITED STATES PATENTS

| | | | |
|---|---|---|---|
| 2,473,419 | 6/1949 | Fletcher et al. | 317—234 |
| 2,482,777 | 9/1949 | Howe | 317—234 |
| 3,411,047 | 11/1968 | Baker et al. | 317—233 |
| 3,450,967 | 6/1969 | Tolutis | 317—241 |
| 3,489,960 | 1/1970 | Hudman | 317—234 |

JAMES D. KALLAM, Primary Examiner

U.S. Cl. X.R.

317—233